(12) United States Patent
Kuter-Arnebeck et al.

(10) Patent No.: US 11,404,886 B2
(45) Date of Patent: Aug. 2, 2022

(54) COMMUNICATING BATTERY CHARGER

(71) Applicant: Snap-on Incorporated, Kenosha, WI (US)

(72) Inventors: Ottoleo Kuter-Arnebeck, Kenosha, WI (US); Randy F. Krist, Kenosha, WI (US)

(73) Assignee: Snap-on Incorporated

( * ) Notice: Subject to any disclaimer, the term of this patent is extended or adjusted under 35 U.S.C. 154(b) by 22 days.

(21) Appl. No.: 16/852,144

(22) Filed: Apr. 17, 2020

(65) Prior Publication Data

US 2021/0328446 A1    Oct. 21, 2021

(51) Int. Cl.
*H02J 7/00*    (2006.01)

(52) U.S. Cl.
CPC ...... *H02J 7/00034* (2020.01); *H02J 7/00041* (2020.01); *H02J 7/00711* (2020.01)

(58) Field of Classification Search
USPC .................................................. 320/106, 108
See application file for complete search history.

(56) References Cited

U.S. PATENT DOCUMENTS

| | | |
|---|---|---|
| 5,432,428 A | 7/1995 | Meadows et al. |
| 5,525,890 A * | 6/1996 | Iwatsu ............... G01R 31/3648 320/106 |
| 5,548,200 A | 8/1996 | Nor et al. |
| 8,143,845 B2 * | 3/2012 | Choi ........................ H02J 7/08 320/108 |
| 8,564,242 B2 | 10/2013 | Hansford et al. |
| 8,626,249 B2 | 1/2014 | Ungari et al. |
| 9,430,928 B2 | 8/2016 | Ikeda et al. |
| 9,466,198 B2 | 10/2016 | Burch et al. |
| 9,467,862 B2 | 10/2016 | Zeiler et al. |
| 9,537,336 B2 | 1/2017 | Suzuki et al. |
| 9,781,496 B2 | 10/2017 | Conrad et al. |
| 9,949,075 B2 | 4/2018 | Burch et al. |
| 10,237,742 B2 | 3/2019 | Zeiler et al. |
| 10,285,003 B2 | 5/2019 | Burch et al. |
| 10,339,496 B2 | 7/2019 | Matson et al. |
| 10,476,284 B2 | 11/2019 | Suzuki et al. |
| 2007/0090788 A1 | 4/2007 | Hansford et al. |
| 2007/0267999 A1 | 11/2007 | Buckley et al. |
| 2014/0107853 A1 | 4/2014 | Ashinghurst et al. |

(Continued)

FOREIGN PATENT DOCUMENTS

| | | |
|---|---|---|
| CN | 107959319 A | 4/2018 |
| TW | 201818630 A | 5/2018 |

(Continued)

OTHER PUBLICATIONS

Australian Office Action for corresponding AU Application No. 2021201877, dated Nov. 15, 2021, 3 pages.

(Continued)

*Primary Examiner* — Samuel Berhanu
(74) *Attorney, Agent, or Firm* — Seyfarth Shaw LLP

(57) ABSTRACT

A battery charger adapted to charge a battery and output battery statue and/or battery information to a mobile computing device and/or a remote server via a wired and/or wireless connection. The battery charger including a rectifier, a controller/processor, a battery connection, an optocoupler, a signal conditioner, and a communication module.

15 Claims, 4 Drawing Sheets

(56) References Cited

U.S. PATENT DOCUMENTS

| | | |
|---|---|---|
| 2015/0035473 A1 | 2/2015 | Zhou et al. |
| 2015/0102777 A1 | 4/2015 | Cooper |
| 2016/0006280 A1 | 1/2016 | Ikeda et al. |
| 2016/0046199 A1* | 2/2016 | Butler .................. H02J 7/0071 |
| | | 320/106 |
| 2016/0049819 A1* | 2/2016 | Butler .................. H02J 7/0068 |
| | | 320/105 |
| 2016/0105044 A1 | 4/2016 | Yamaguchi et al. |
| 2016/0172876 A1 | 6/2016 | Stewart et al. |
| 2016/0226278 A1 | 8/2016 | Wenger et al. |
| 2018/0083461 A1 | 3/2018 | Ravi et al. |
| 2019/0075665 A1* | 3/2019 | Choksi .............. H01M 10/6551 |
| 2019/0156278 A1 | 5/2019 | Matson et al. |
| 2019/0159034 A1 | 5/2019 | Zeiler et al. |
| 2019/0222957 A1 | 7/2019 | Burch et al. |
| 2019/0237816 A1 | 8/2019 | Kim et al. |
| 2019/0252735 A1* | 8/2019 | Sung .................... H01M 10/42 |

FOREIGN PATENT DOCUMENTS

| | | | | |
|---|---|---|---|---|
| WO | WO-2009021771 A2 * | 2/2009 | ........... G01R 31/396 |
| WO | 2019054851 A2 | 3/2019 | |

OTHER PUBLICATIONS

United Kingdom Search Report for corresponding UK Application No. GB2104478.9, dated Sep. 30, 2021, 5 pages.
Taiwan Office Action for corresponding TW Application No. 110113736, dated Feb. 24, 2022, 11 pages.
Canadian Office Action for corresponding CA Application No. 3,114,387, dated Apr. 8, 2022, 3 pages.

* cited by examiner

COMMUNICATING BATTERY CHARGER

TECHNICAL FIELD OF THE INVENTION

The present invention relates generally to a battery charger. More particularly, the present invention relates to a battery charger that communicates data via a wireless and/or wired connection.

BACKGROUND OF THE INVENTION

Battery chargers are commonly used in automotive, industrial, and household applications to charge batteries that function as a power source for tools, such as motorized ratchet wrenches, drivers, impact tools, and drills, for example. Battery chargers typically indicate the charge status or state of the battery being charged by using a gauge indicator (e.g. incremental LED lights) on the exterior of the housing to signify the charge state of the battery. However, on a worksite or other locations, the battery charger may be charging a battery some distance away from an operator, or otherwise the charge state is not easily viewable or accessible, thus the charge state of the battery is often difficult to ascertain.

SUMMARY OF THE INVENTION

The present invention relates broadly to a battery charger adapted to charge one or more batteries, and the charger is further adapted to communicate data via a wireless and/or wired connection. The data may contain information on the status of the system or connected battery. Examples of data types include, but is not limited to, the state of charge the battery that is connected to the charger, the supplied current and voltage to the battery, and/or the temperature of the system.

In particular, the present invention broadly includes a battery charger adapted to charge a battery and output battery information. The battery charger includes a rectifier adapted to receive power provided by an external power source, a battery connection adapted to couple to and supply power to a battery, a controller adapted to determine a battery status and regulate power supplied to the battery connection based on the battery status, an optocoupler adapted to link the battery via the battery connection to the controller, a signal conditioner adapted to receive signals via the optocoupler and transform the received signals into a computer readable format, and a communication module adapted to transmit the transformed signals.

In another embodiment, the present invention further broadly includes a method of communicating a status of a battery being charged by a battery charger. The battery charger includes a rectifier, a processor, a battery connection, an optocoupler, a signal conditioner, and a communication module. The method includes receiving, by the signal conditioner, signals including battery status from the optocoupler, transforming, by the signal conditioner, signals into a computer readable format, outputting, by the communication module, transformed signals to a computing device, and displaying the battery status on a display of the computing device.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE INVENTION

Figure 1:
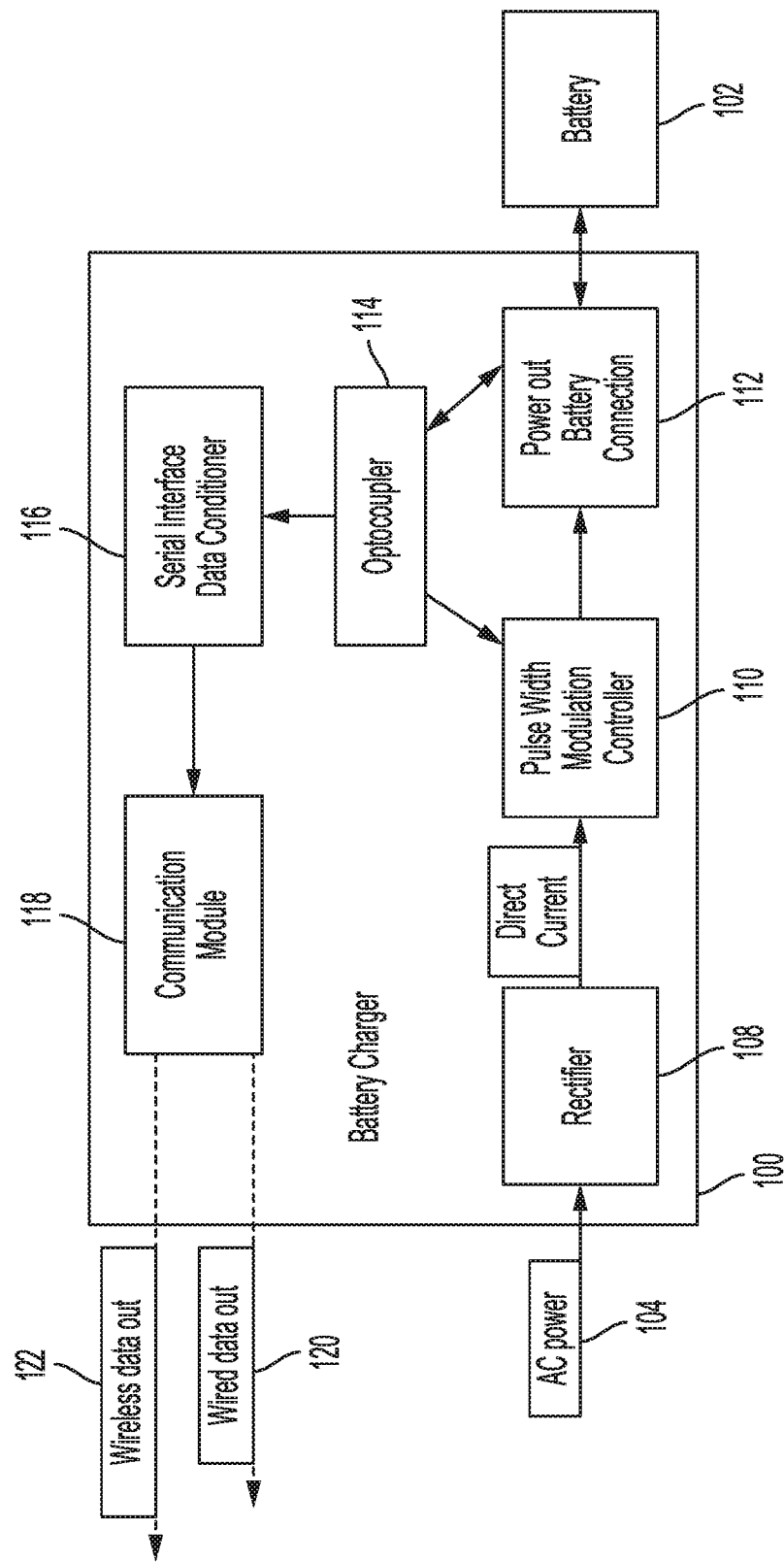
FIG. 1 is a block diagram conceptually illustrating example electronic components of a battery charger in accordance with an embodiment of the present invention.
Figure 2:
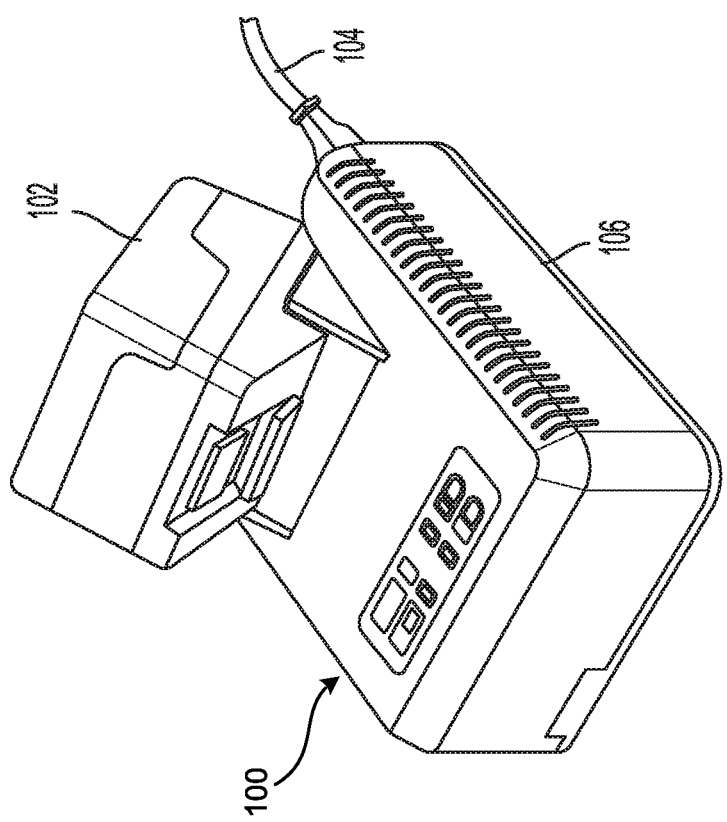
FIG. 2 is a perspective view of a battery charger and a battery in accordance with an embodiment of the present invention.

While the present invention is susceptible of embodiments in many different forms, there is shown in the drawings, and will herein be described in detail, embodiments of the invention, including a preferred embodiment, with the understanding that the present disclosure is to be considered as an exemplification of the principles of the present invention and is not intended to limit the broad aspect of the invention to any one or more embodiments illustrated herein. As used herein, the term "present invention" is not intended to limit the scope of the claimed invention, but is instead used to discuss exemplary embodiments of the invention for explanatory purposes only.

The present invention broadly comprises a battery charger, which is able to output data wirelessly and/or by a wired connection. The data provides information regarding the status of, or other information relating to, the battery or batteries that are operably coupled to the battery charger. The data can be communicated to a remote computing device, such as, for example, a remote server and/or a mobile computing device, such as, for example, a mobile phone. The communicated data enhances the ability of an operator to monitor the status of the battery or batteries being charged by the battery charger, compared to current solutions.

Referring to FIGS. 1-4, a battery charger 100 is adapted to couple to and charge a battery 102. The battery 102 may be a rechargeable power source for a tool, such as, for example, motorized ratchet wrenches and drivers, impact tools, drills, or any other type of electronic devices utilizing batteries. The battery 102 may be any one of a lead-acid, nickel-cadmium (NiCd), nickel-metal hydride (NIMH), lithium-ion (Li-ion), lithium-ion polymer (LiPo), and rechargeable alkaline battery.

The battery charger 100 is coupled to an external power source (not shown) via a cord 104 or other type of wired connection. The external power source supplies AC power, which may be in a range of 110 V to 220 V. The battery charger 100 includes a housing 106 that contains components that allow for charging of the battery 102, determine the status of, and/or other information about, the battery 102, and communicate data regarding the status and/or information about the battery 102. The status about the battery 102 may include, for example, charge state, temperature or charge cycles. Information about the battery 102 may include, for example, manufacturer, manufacture date, voltage, amps or other identifying information. The components of the battery charger 100 include a rectifier 108, a controller/processor 110, a battery connection 112, an optocoupler 114, a signal conditioner 116, and a communication module 118.

Power provided by the external power source may be alternating current (AC) and received by the rectifier 108, such as, for example via the cord 104. The rectifier 108 is adapted to convert AC to direct current (DC). The converted DC may be in a range of 12 V to 72 V.

The controller/processor 110 regulates the power supplied to the battery connection 112. The battery connection 112 is adapted to operably couple to and supply the regulated power to the battery 102 via a physical connecting point or a wireless power transmission module, such as an induction coil or radio frequency antennae, to thus charge the battery. The controller/processor 110 regulates the supplied power using Pulse Width Modulation (PWM), for example. In an embodiment, the controller/processor 110 includes a central processing unit (CPU) for processing data and computer-readable instructions using known methods. For example, the processor/controller 110 retrieves instructions from data storage via a bus, using a memory for runtime temporary storage of instructions and data. The memory may include volatile and/or nonvolatile random access memory (RAM). The components may also be connected to other components in addition to (or instead of) being connected to other components via the bus.

The optocoupler 114 is adapted to transfer electrical signals between two isolated circuits using light. In an example, the optocoupler 114 links the battery 102 via the battery connection 112 to the processor/controller 110. The processor/controller 110 determines battery information, such as a battery status. The battery status can include information such as the state of charge and/or the temperature of the battery 102. The processor/controller 110 regulates the power being supplied to the battery connection 112 based on the determined battery status. The processor/controller 110 can also determine additional battery information, such as, for example, the manufacturer of the battery, the manufacture date of the battery, identifying information about the battery, etc.

The optocoupler 114 also sends the electrical signals indicating the battery status and/or battery information to the signal conditioner 116. The signal conditioner 116 transforms the received electrical signals into a computer readable format. In an embodiment, the signal conditioner 116 transforms the electrical signals to serial data format.

The signal conditioner 116 sends the transformed signals to the communication module 118. The communication module 118 can further format the transformed signal for communication. The communication module 118 transmits the transformed signal including the battery status and/or battery information using a wired connection 120 and/or a wireless transmission 122 to one or more computing devices, such as one or more mobile computing devices 124 and/or one or more remote servers 126. The communication module 118 can include a transmitter, a receiver, and associated encoders, modulators, demodulators, and decoders. The communication module 118 manages and establishes communication links 128 with the mobile computing device 124 via one-or-more antennas (not shown) disposed in the battery charger 100, thereby enabling bidirectional communication between the battery charger 100 and a software application executed by the mobile computing device 124. The communication links 128 may be a direct link between the battery charger 100 and the mobile computing device 124 (as illustrated), or may be an indirect link through one-or-more intermediate components, such as via a Wi-Fi router or mesh connection (not illustrated).

Figure 3:
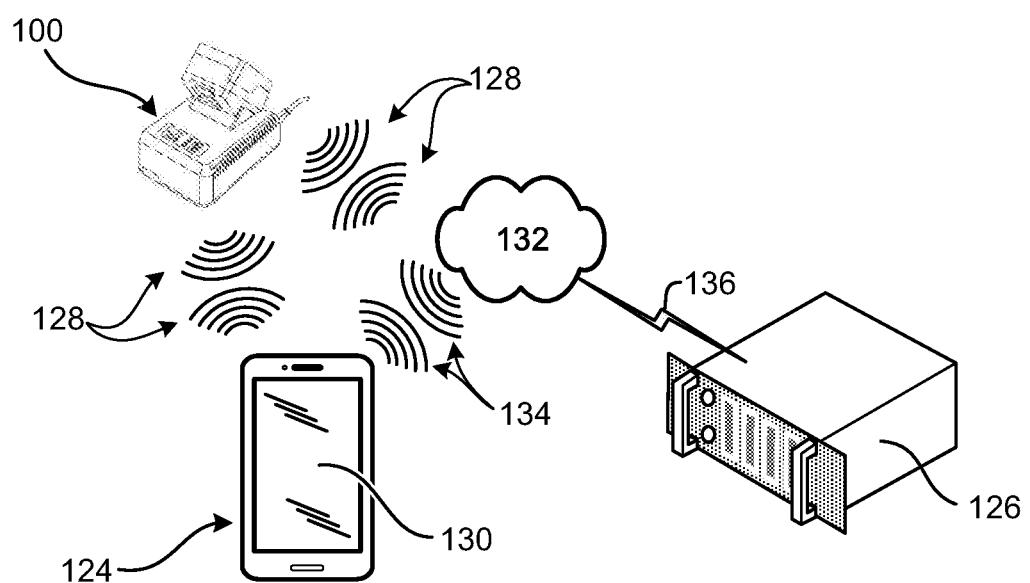
FIG. 3 illustrates an example of a system including a battery charger and a mobile computing device.

Referring to FIG. 3, an example of a system including a battery charger 100 and a mobile computing device 124. The battery charger 100 communicates with the mobile computing device 124 via a wireless transmission 122 by establishing the communication link 128 using a protocol such as infrared, Bluetooth, Bluetooth Smart (also known as Bluetooth low energy), Wi-Fi Direct, or any other wireless protocol. In an embodiment, the mobile computing device 124 includes a touch-sensitive display 130 via which an operator interacts with user interfaces provided by a software application on the mobile computing device 124. Among other things, the software application may be used to display battery status and/or battery information, such as the state of charge the battery 102 that is connected to the charger 100, the supplied current and voltage to the battery 102, the temperature of the system, the manufacturer of the battery 102, the manufacture date of the battery 102, the number of charge cycles, or identifying information about the battery 102, etc. The software application also provides the technician with live, real-time feedback and interactive functionality to assist the operator with determining the battery status.

In another embodiment, the battery charger 100 also communicates battery status and/or battery information with the one or more remote servers 126 via wireless transmission 122 by establishing the communication link 128 to a data communications network 132, such as the Internet. The communication link 128 may use, for example, a protocol such as infrared, Bluetooth, Bluetooth Smart (also known as Bluetooth low energy), Wi-Fi Direct, or any other wireless protocol to link with a local wireless router. In this embodiment, the mobile computing device 124 retrieves or receives battery status and/or battery information via a wireless communications link 134 to the data communications network 132. The wireless communications link 134 may be, for example, a Wi-Fi link between the mobile computing device 124 and a local wireless router, or a cellular data link between the mobile computing device 124 and a nearby cell tower, using a cellular protocol such as Long Term Evolution (LTE), Global System for Mobile Communications (GSM), Code Division Multiple Access (CDMA), etc. One-or-more remote servers 126 are connected to the data communications network 132 via communications link(s) 136. Based on queries received from the software application on the mobile computing device 124, the remote server 126 transmits battery status and/or battery information to the mobile computing device 124 via the data communications network 132. Among other system arrangements, the remote server(s) 126 may be associated with a software service provider, a manufacturing company, or with a company providing repair services.

Figure 4:
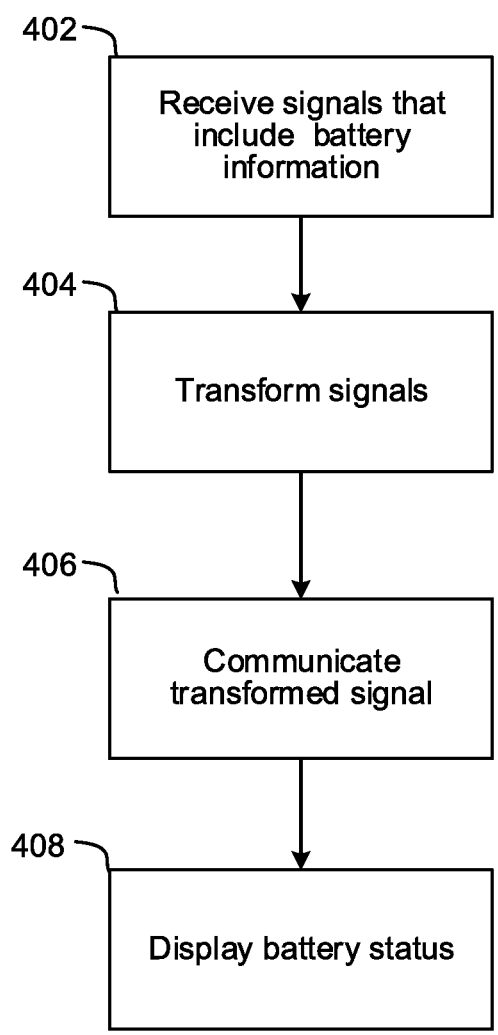
FIG. 4 is a flow chart illustrating a method of communicating a status of a battery being charged by a battery charger in accordance with an embodiment of the present invention.

FIG. 4 is a method of communicating a status of or information about a battery 102 being charged by a battery charger 100. For example, the signal conditioner receives (402) electrical signals including the battery status and/or battery information from the optocoupler 114. The signal conditioner 116 transforms (404) the received electrical signals into a computer readable format. The communication module 118 outputs (406) the transformed signal including the battery status and/or battery information using a wired connection 120 and/or a wireless transmission 122 to a computing device, such as one or more mobile computing devices 124 and/or one or more remote servers 126. The battery status and/or battery information is then displayed (408) on a display of the one or more mobile computing devices 124 and/or the one or more remote servers 126.

The concepts disclosed herein may be applied within several different devices and computer systems. Although the mobile computing device 124 is described as a mobile device, any computer may be used. Likewise, the remote server(s) 126 may be any sort of computer.

The specific examples discussed above are meant to be illustrative. They were chosen to explain the principles and application of the invention and are not intended to be exhaustive. Persons having ordinary skill in the field of computers or battery technology should recognize that components and process steps described herein may be interchangeable with other components or steps, or combinations of components or steps, and still achieve the benefits and advantages of the present invention.

The processes executed by the battery charger 100, the mobile computing device 124, and remote servers 126 may be implemented as a computer method or as an article of manufacture such as a memory device or non-transitory computer readable storage medium. The computer readable storage medium may be readable by a computer and may comprise instructions for causing a computer or other device to perform the described processes. The computer readable storage medium may be implemented by a non-volatile computer memory, storage, or media. In addition, some of the processing operations attributed to the battery charger 100 may be implemented as firmware or as a state machine in hardware, such as implementing some or all of the operations executed by processor/controller 110 as an application specific integrated circuit (ASIC), a field programmable gate array (FPGA), or some combination thereof.

As used herein, the term "coupled" can mean any physical, electrical, magnetic, or other connection, either direct or indirect, between two parties. The term "coupled" is not limited to a fixed direct coupling between two entities.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A battery charger adapted to charge a battery and output battery information, the battery charger comprising:
    a battery connection adapted to couple to and supply power to a battery;
    a controller adapted to determine a battery status and regulate power supplied to the battery based on the battery status;
    an optocoupler adapted to link the battery via the battery connection to the controller;
    a signal conditioner adapted to receive signals from the optocoupler and transform the received signals into a computer readable format, thereby creating computer readable signals; and
    a communication module adapted to transmit the computer readable signals to an external device.

2. The battery charger of claim 1, further comprising a rectifier adapted to receive power provided by an external power source.

3. The battery charger of claim 1, wherein the battery connection is a physical connecting point.

4. The battery charger of claim 1, wherein the battery connection is a wireless power transmission module.

5. The battery charger of claim 1, wherein the controller is adapted to receive direct current (DC) power in a range of about 12 V to about 72 V.

6. The battery charger of claim 1, wherein the controller regulates power using Pulse Width Modulation (PWM).

7. The battery charger of claim 1, wherein the battery status includes one or more of a state of charge, temperature of the battery, and charge cycles.

8. The battery charger of claim 1, wherein the battery information includes one or more of a manufacturer of the battery, a manufacture date of the battery, and identifying information about the battery.

9. The battery charger of claim 1, wherein the computer readable signals transmitted by the communication module includes the battery information and the battery status.

10. The battery charger of claim 1, wherein the battery status includes a state of charge the battery, current and voltage being supplied to the battery, a temperature of the battery and charge cycles.

11. The battery charger of claim 1, wherein the communication module transmits the transformed electrical signals via a wired connection to the external computing device.

12. The battery charger of claim 1, wherein the communication module transmits the computer readable signals via a wireless transmission to the external computing device.

13. A method of communicating a status of a battery being charged by a battery charger, the battery charger including a rectifier, a processor, a battery connection, an optocoupler adapted to link the battery via the battery connection to the processor, a signal conditioner, and a communication module, the method comprising:
    receiving, by the signal conditioner, signals including battery status information from the optocoupler;
    transforming, by the signal conditioner, electrical signals into a computer readable format;
    outputting, by the communication module, transformed electrical signals to an external computing device; and
    displaying the battery status information on a display of the external computing device.

14. The method of claim 13, wherein the step of outputting is via a wired connection with the external computing device.

15. The method of claim 13, wherein the step of outputting is via a wireless transmission with the external computing device.

* * * * *